US012772918B2

(12) United States Patent
Ding

(10) Patent No.: US 12,772,918 B2
(45) Date of Patent: Oct. 27, 2026

(54) GRASS COMBING MACHINE

(71) Applicant: Suzhou Firefly Information Technology Co., Ltd., Suzhou (CN)

(72) Inventor: Hongdan Ding, Suzhou (CN)

(73) Assignee: Suzhou Firefly Information Technology Co., Ltd., Suzhou (CN)

( * ) Notice: Subject to any disclaimer, the term of this patent is extended or adjusted under 35 U.S.C. 154(b) by 385 days.

(21) Appl. No.: 18/517,433

(22) Filed: Nov. 22, 2023

(65) Prior Publication Data

US 2024/0407277 A1 Dec. 12, 2024

(30) Foreign Application Priority Data

Jun. 7, 2023 (CN) ......................... 202321443257.5

(51) Int. Cl.
*A01B 45/00* (2006.01)
*A01G 20/43* (2018.01)

(52) U.S. Cl.
CPC .............. *A01B 45/00* (2013.01); *A01G 20/43* (2018.02)

(58) Field of Classification Search
CPC ................................ A01B 45/00; A01G 20/43
See application file for complete search history.

(56) References Cited

U.S. PATENT DOCUMENTS

| | | | | |
|---|---|---|---|---|
| 251,835 A * | 1/1882 | Colvin | A01B 45/00 | 56/369 |
| 3,099,347 A * | 7/1963 | Dahlquist | A01D 80/02 | 198/692 |
| 4,689,941 A * | 9/1987 | Doering | A01D 76/00 | 56/375 |
| 4,945,996 A * | 8/1990 | Codding | A01B 63/14 | 56/395 |
| 7,063,165 B2 * | 6/2006 | Bowsher | A01B 35/28 | 172/604 |
| 11,483,986 B1 * | 11/2022 | Soper | A01B 45/00 | |
| 2006/0236670 A1 * | 10/2006 | Glasford | A01D 43/02 | 56/257 |
| 2008/0000651 A1 * | 1/2008 | Bowsher | A01B 63/166 | 172/22 |

* cited by examiner

*Primary Examiner* — William D Hutton, Jr.
*Assistant Examiner* — Jose Antonio Martinez
(74) *Attorney, Agent, or Firm* — Westbridge IP LLC

(57) ABSTRACT

Disclosed are a grass combing mechanism and a grass combing machine. The grass combing mechanism includes a mounting main body and a plurality of elastic grass combing components, each of the elastic grass combing components comprises at least one elastic comb tooth and a mounting part connected with the at least one elastic comb tooth, and the mounting part is mounted on the mounting main body. The mounting main body is provided with a fixing member corresponding to each of the elastic grass combing components, a communication gap is formed between the fixing member and the mounting main body, the mounting part is inserted into the communication gap from one side and extends out from the other side of the fixing member, and the part of the mounting part extending out from the other side of the fixing member is fixed on the mounting main body.

5 Claims, 5 Drawing Sheets

GRASS COMBING MACHINE

CROSS-REFERENCE TO RELATED APPLICATION

The present disclosure claims priority to Chinese Patent Application No. 202321443257.5, filed on Jun. 7, 2023, which is hereby incorporated by reference in its entirety.

TECHNICAL FIELD

The present application relates to the technical field of lawn maintenance equipment, and specifically to a grass combing mechanism and a grass combing machine.

BACKGROUND

At present, grass combing machines are widely applied in garden work. Grass combing machines are used for combing and removing withered grass to maintain healthy growth of a lawn.

A grass combing machine usually includes a mounting main body and a plurality of elastic grass combing components arranged on the mounting main body. Fixing structures currently used for fixing the elastic grass combing components on the mounting main body make it time-consuming and laborious to disassemble and assemble the elastic grass combing components. This not only leads to low production efficiency but also makes it difficult to replace the elastic combing components when they are damaged.

SUMMARY

In view of this, the present application provides a grass combing mechanism and a grass combing machine to solve the problem of time-consuming and laborious disassembly and assembly of the elastic grass combing components in current grass combing machines.

The present application provides a grass combing mechanism. The grass combing mechanism includes a mounting main body and a plurality of elastic grass combing components mounted on the mounting main body. Each of the elastic grass combing components includes at least one elastic comb tooth and a mounting part connected with the at least one elastic comb tooth. The mounting part is mounted on the mounting main body. In addition, the mounting main body is provided with a fixing member corresponding to each of the elastic grass combing components. A communication gap communicating from one side to the other of the fixing member is formed between the fixing member and the mounting main body. The mounting part is inserted into the communication gap from one side of the fixing member so that a middle part of the mounting part is positioned in the communication gap and an end part extends out from the other side of the fixing member. The end part of the mounting part is fixed on the mounting main body by means of a detachable fastener.

In an embodiment, the fixing member constrains the end part of the mounting part so as to fix the mounting part in a direction perpendicular to an inserting direction of the mounting part.

In an embodiment, the detachable fastener is configured to constrain the end part of the mounting part so as to fix the mounting part along an inserting direction of the mounting part.

In an embodiment, the detachable fastener is configured to prevent the mounting part from being drawn out from the communication gap.

In an embodiment, the detachable fastener is configured to prevent the mounting part from being drawn out from the communication gap by obstructing the mounting part.

In an embodiment, the detachable fastener is configured to prevent the mounting part from being drawn out from the communication gap by pressing the mounting part to the mounting main body.

In an embodiment, the detachable fastener is configured to prevent the mounting part from being drawn out from the communication gap by obstructing the mounting part and pressing the mounting part to the mounting main body.

In an embodiment, the end part of the mounting part is provided with an anchor part, and the detachable fastener is positioned between the mounting member and the anchor part so as to prevent the mounting part from being drawn out from the communication gap.

In an embodiment, the detachable fastener is a screw or a bolt, and a shank of the screw or the bolt is configured to obstruct the anchor part to prevent the mounting part from being drawn out.

In an embodiment, a head of the screw or the bolt is configured to press the end part to the mounting main body to prevent the mounting part from being drawn out.

In an embodiment, each of the elastic grass combing components includes two elastic comb teeth, the mounting part includes two rod-shaped bodies respectively connected to the two elastic comb teeth, the two rod-shaped bodies are connected to form an angular structure, the angular structure extends into the communication gap, and a corner part, extending out from the communication gap, of the angular structure is fixed on the mounting main body.

In an embodiment, each elastic grass combing component is integrally formed by bending a strip-shaped component, each of the elastic comb teeth comprises two spiral spring parts and two comb teeth parts, end parts of the two rod-shaped bodies of the mounting part respectively extend and are bent to form the spiral spring parts, and two ends, away from the rod-shaped bodies, of the spiral spring parts extend to form the comb tooth parts respectively for combing grass.

In an embodiment, the mounting main body is of a plate-shaped structure, the elastic grass combing components are mounted on one side of the plate-shaped structure, and the other side facing away from the elastic grass combing components is configured to bear a counterweight.

According to another aspect of the present application, a grass combing machine is further provided, where the grass combing machine includes a wheel, a traction frame, and any one of the grass combing mechanisms as described above. The wheel and the traction frame are connected to the mounting main body, and the traction frame is configured to be connected to a walking device, so that the grass combing machine is capable of being pulled to walk by means of the walking device.

In an embodiment, the grass combing machine further includes a first bracket and a second bracket both mounted on the mounting main body, where the second bracket is farther away from a traction end of the traction frame than the first bracket, and the second bracket is provided with a slot extending in the direction away from the mounting main body. The traction frame is rotatably mounted on the first bracket by a first bolt and is movably mounted on the second bracket along the slot through a second bolt.

In an embodiment, two first brackets and two second brackets are respectively provided, and the two first brackets and the two second brackets are respectively arranged in a direction perpendicular to a walking direction of the grass combing machine; and the traction frame includes two traction rods, and each of the traction rods is correspondingly connected to one of the first brackets and one of the second brackets.

In an embodiment, the traction end of the traction frame is connected to a traction joint, the traction joint includes two traction plates arranged up and down, the two traction plates form a gap for insertion of a connecting plate of the walking device, and a connecting hole for insertion of a connecting column is formed in each of the two traction plates.

In an embodiment, the grass combing machine further includes a height-adjusting mechanism configured to adjust a height position of the mounting main body relative to the wheel, so that the grass combing mechanism is capable of being switched between a working position close to ground and a retracted position away from ground.

In an embodiment, the grass combing machine further includes a wheel mounting frame, the wheel mounting frame is rotatably mounted on the mounting main body, and the wheel is rotatably mounted on the wheel mounting frame; and an adjusting hole is provided on the mounting main body, the adjusting hole includes a first length slot and a second length slot communicated with each other, a length of the first length slot and a length of the second length slot are different in a direction perpendicular to the rotating shaft of the wheel, the height-adjusting mechanism includes an adjusting rod connected to the wheel mounting frame and penetrating through the adjusting hole upwards, and the adjusting rod is arranged to switch between the first state locked in the first length slot and the second state locked in the second length slot, so that the grass combing mechanism is capable of switching between the working position and the retracted position.

In an embodiment, the grass combing machine further includes a reinforcing plate fixed on an upper surface of the mounting main body, the reinforcing plate is fixed at the adjusting hole of the mounting main body, and the reinforcing plate is provided with an opening corresponding to the adjusting hole and having a consistent shape.

According to the technical solutions provided in the present application, the mounting part of the elastic combing component is inserted into the communication gap between the fixing member and the mounting main body. Then, the mounting part extending out from the communication gap is secured to the mounting main body, for example, by a bolt, thereby mounting the elastic combing components to the mounting main body. The above-described method for assembling the elastic grass combing component is simple and facilitates assembly efficiency. The elastic comb grass component can be easily disassembled by removing the bolt that secures the mounting part and taking out the mounting part from the communication gap, allowing for easy replacement of the elastic grass combing component.

Further features and advantages of the present application are described in detail in the following detailed description.

BRIEF DESCRIPTION OF THE DRAWINGS

The accompanying drawings constituting a part of the present application are used to provide further understanding of the present application. The schematic embodiments of the present application and the description thereof are used to explain the present application, and do not constitute an improper limitation on the present application.

DETAILED DESCRIPTIONS OF THE EMBODIMENTS

Figure 1:
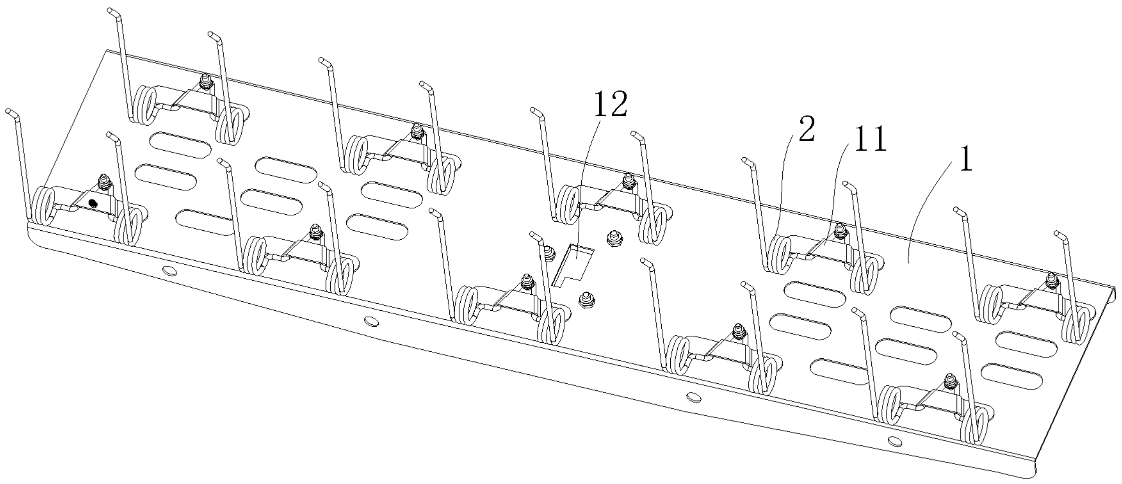
FIG. 1 is a schematic structural diagram of a grass combing mechanism according to an embodiment of the present application.

Technical solutions in embodiments of the present application are clearly and completely described below with reference to accompanying drawings in the embodiments of the present application. Obviously, the described embodiments are only a part of the embodiments of the present application, but are not all embodiments. All other embodiments obtained by a person of ordinary skill in the art based on the embodiments of the present application without creative efforts shall fall within protection scope of the present application. Unless conflicting, the embodiments and features in the embodiments in this application may be combined with each other.

In the description of the present application, it should be understood that an orientation or positional relationship indicated by terms “center”, “longitudinal”, “transverse”, “upper”, “lower”, “left”, “right”, “vertical”, “horizontal”, “top”, “bottom”, “axial”, “radial”, “circumferential”, and the like is based on an orientation or positional relationship shown in the accompanying drawings, and is merely intended to facilitate the description of the present application and simplify the description, rather than to indicate or imply that a device or element referred to must have a particular orientation, and be constructed and operated in a particular orientation, and therefore may not be understood as a limitation to the present application. In addition, “inside and outside” means inside and outside relative to an outline of each component itself.

In addition, terms “first” and “second” are used for descriptive purposes only and may not be understood as indicating or implying relative importance or implicitly indicating the number of indicated technical features. Thus, features defined with “first” and “second” may explicitly or implicitly include at least one of the features.

The present application provides a grass combing mechanism. As shown in FIG. 1 to FIG. 3*a*, the grass combing mechanism includes a mounting main body 1 and a plurality of elastic grass combing components 2 mounted on the mounting main body 1. Each of the elastic grass combing components 2 includes at least one elastic comb tooth 21 and a mounting part 22 connected with the at least one elastic comb tooth 21. The mounting part 22 is mounted on the mounting main body 1.

The mounting main body 1 is provided with a fixing member 11 corresponding to each of the elastic grass combing components 2. A communication gap (the gap indicated with M in FIG. 2) communicating from one side to the other side of the fixing member 11 is formed between the fixing member 11 and the mounting main body 1. The mounting part 22 is inserted into the communication gap M from one side and extends out from the other side of the fixing member 11. An end part 211*b*, extending out from the other side of the fixing member 11, of the mounting part 22 is fixed on the mounting main body 1 by means of a detachable fastener 30 such as a bolt or a screw. The fixing member 11 may be a plate-shaped structure, whose two ends are respectively fixed on the mounting main body 1 by welding or other connection manners, so as to form the communication gap between the part between the two ends of the fixing member 11 and the mounting main body 1.

According to a technical solution provided in the present application, the manner of mounting the elastic grass combing component 2 on the mounting main body 1 is inserting the mounting part 22 into the communication gap between the fixing member 11 and the mounting main body 1 and then fixing the end part 211*b* extending out from the communication gap by means of a bolt, which is simple and could be beneficial to improving the assembly efficiency. In addition, it makes the elastic comb grass component 2 easy to disassemble by simply disassembling the detachable fastener 30 for fixing the mounting part 22 and then removing the mounting part 22 from the communication gap. In that way, the elastic grass combing component 2 may be conveniently replaced.

Figure 2:
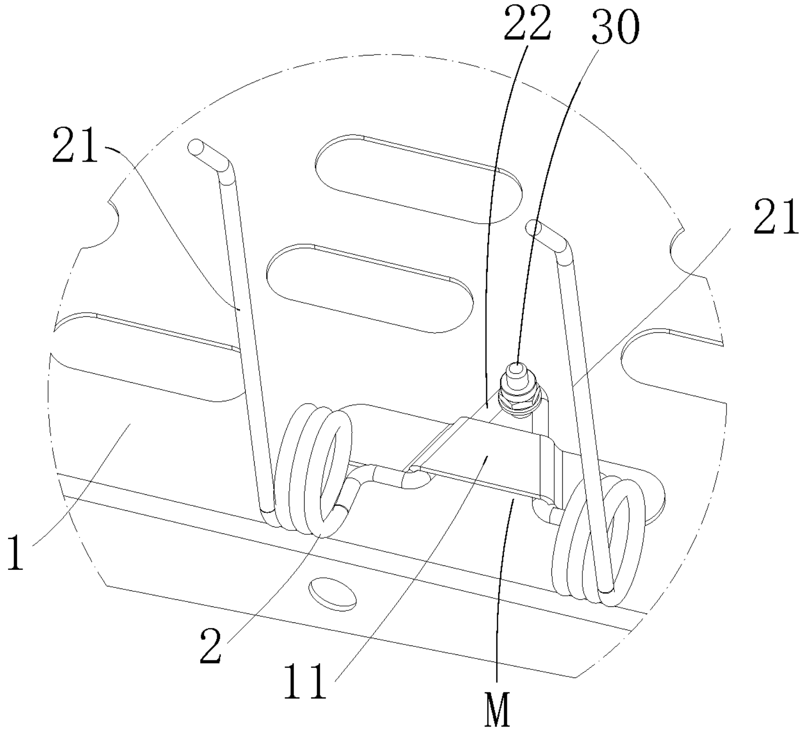
FIG. 2 is a partially enlarged view of FIG. 1.
Figure 3:
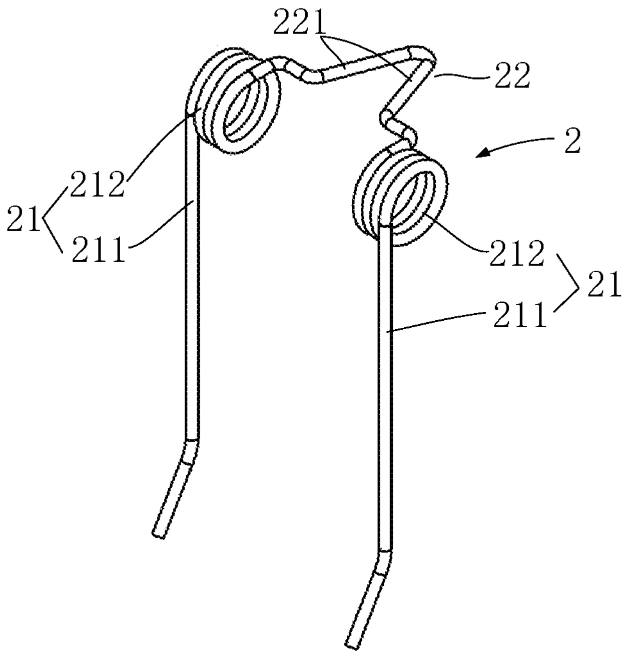
FIG. 3 is a schematic structural diagram of an elastic grass component according to an embodiment of the present application.
Figure 3A:
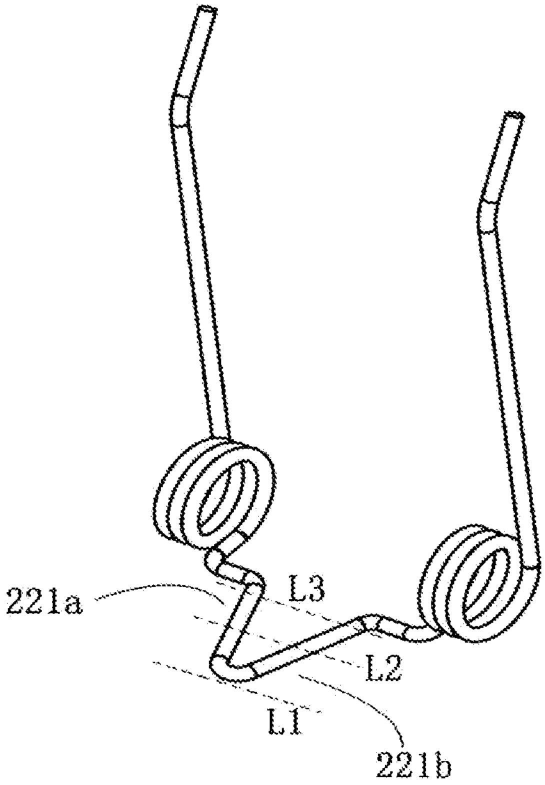
FIG. 3*a* is another view of the elastic grass component shown in FIG. 3.

In an embodiment, as shown in FIG. 2 and FIG. 3, each of the elastic grass combing components 2 includes two elastic comb teeth 21. The mounting part 22 includes two rod-shaped bodies 221 respectively connected to the two elastic comb teeth 21. The two rod-shaped bodies 221 are connected together to form an angular structure. The angular structure extends into the communication gap between the mounting main body 1 and the fixing member 11, and an end part 221*b* of the angular structure extending out from the communication gap M is fixed on the mounting main body 1 by means of a bolt. Specifically, a middle part 221*a* (the part between the dashed lines L3 and L2 show in FIG. 3*a*) of the angular structure is in the communication gap M and the end part 221*b* (the part between the dashed lines L2 and L1) is extended out of the communication gap M. In this way, the fixing member 11 may constraint the middle part 221*a* so as to limit degrees of freedom of the mounting part in the direction perpendicular to the direction of the mounting part being inserted into the communication gap M, and the detachable fastener 30 may constraint the end part 221*b* so as to limit the degrees of freedom of the mounting part in the direction along the direction of the mounting part being inserted into the communication gap M. Specifically, detachable fastener 30 such as a bolt may pass through the included angle of the corner part, so that the shank is positioned between the end part 221*b* and the fixing member so as to obstruct the mounting part 22 to prevent it from being drawn out from the communication gap M. The corner part is a curved metal stem, used as an anchor part, hooked around the shank of the bolt so as not to be drawn out from the communication gap M. In addition, the head of the bolt or the nut matched with the bolt is pressed against the corner part of the two rod-shaped bodies 221 to fix the angular structure on the mounting main body 1. The mounting hole may also be provided on the corner part so that the bolt may pass through the mounting hole to fix the angular structure on the mounting main body 1.

In an embodiment, each elastic grass combing component 2 is formed by integrally bending of a strip-shaped component. As shown in FIG. 3, end parts of the two rod-shaped bodies 221 of the mounting part 22 respectively extend and are bent to form spiral spring parts 212, and the ends, away from the rod-shaped body 221, of the spiral spring parts 212 extend to form comb tooth parts 211 for combing grass, and each of the elastic comb teeth 21 includes the spiral spring part 212 and the comb tooth part 211.

It may be understood that each of the two elastic comb teeth 21 may also be formed separately and then welded to the mounting part 22 as a whole. In addition, the structure of the elastic comb tooth 21 is not limited to the structural form as shown above, and other comb tooth structures that can pass through an obstruction by elastically deforming according to the resistance of the lawn when combing the lawn, are also acceptable.

In an embodiment, the mounting main body 1 is a plate-shaped structure. On one side of the plate-shaped structure the elastic grass combing components 2 are mounted, and the other side facing away from the elastic grass combing components 2 is configured to bear a counterweight.

Figure 4:
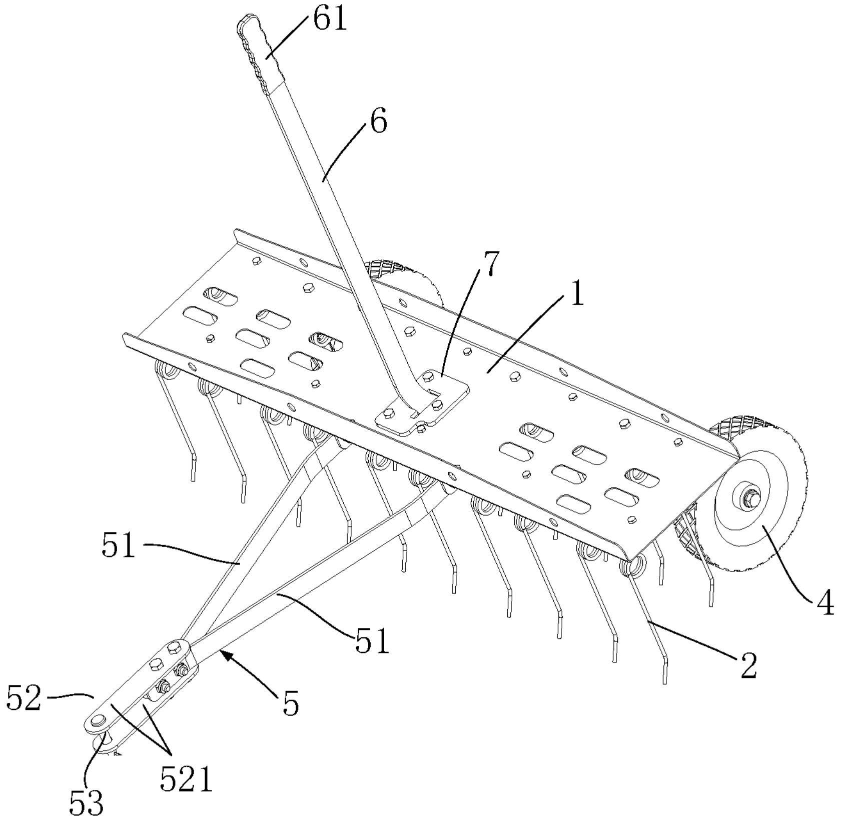
FIG. 4 is a schematic structural diagram of a grass combing machine according to an embodiment of the present application.

Further, referring to FIG. 4, the grass combing mechanism provided in the present application may be applied to a grass combing machine. In application, one side of the mounting main body 1 on which the elastic grass combing components 2 are mounted is facing the ground, and the other side (upper surface) may be provided with a counterweight. Two opposite edges (the edges on a front side and a rear side in walking direction) on the mounting main body 1 are bent upwards to form two stops, and the two stops may prevent the counterweight from detaching from the mounting main body 1.

Figure 5:
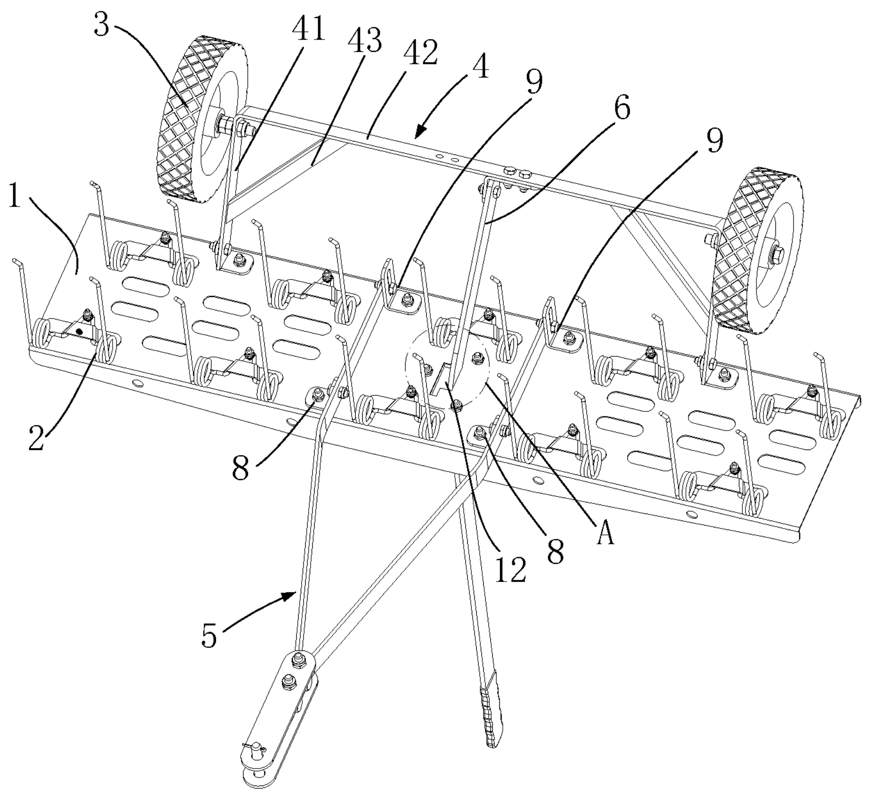
FIG. 5 is a schematic structural diagram of a view from below of the grass combing machine shown in FIG. 4.

According to another aspect of the present application, a grass combing machine is further provided. As shown in FIG. 4 and FIG. 5, the grass combing machine includes a wheel 3, a traction frame 5, and the grass combing mechanism as described above.

The wheel 3 and the traction frame 5 are connected to the mounting main body 1. The traction frame 5 is configured to be connected to a walking device so that the grass combing machine can be pulled to walk by means of the walking device.

Figure 7:
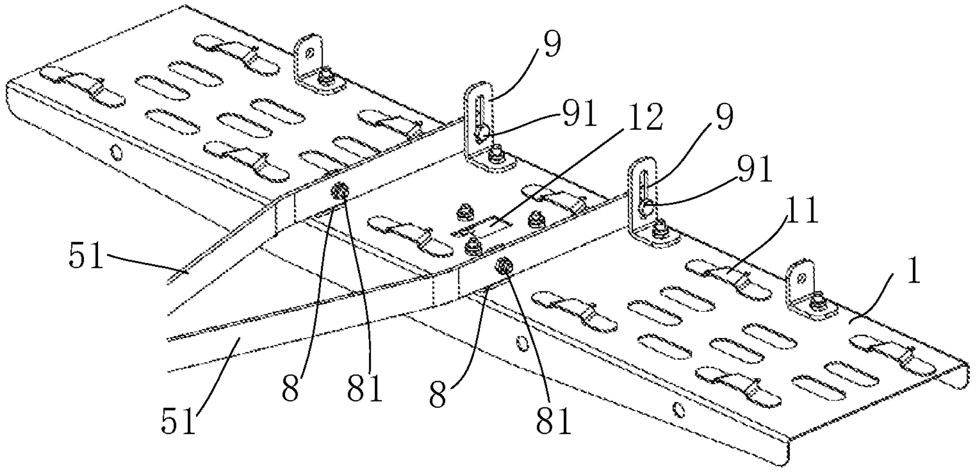
FIG. 7 is a schematic diagram of a mounting structure of a traction frame on a mounting main body according to an embodiment of the present application.

Referring to FIG. 7, in an embodiment, the grass combing machine further includes two first brackets 8 and two second brackets 9, which are mounted on the mounting main body 1. The two second brackets 9 are farther away from a traction end of the traction frame 5 than the two first brackets 8, and the second brackets 9 are provided with slots. The traction frame 5 is rotatably mounted on the two first brackets 8 by first bolts 81, and also movably mounted on the second bracket 9 along the slot by second bolts 91. The traction end of the traction frame 5 refers to the end for connecting the walking device.

According to the mounting method, the traction end of the traction frame 5 may adapt to walking devices with different heights. The traction end can be adjusted up/down based on the height of the connection position of the walking device so that the traction frame 5 can be connected to the walking device, and meanwhile the traction frame 5 can rotate around the first bolts 81, so the other end of the traction frame 5, which is away from the traction end, will swing in a way of moving between the two ends of the slot in the second bracket 9.

Further, the two first brackets 8 and the two second brackets 9 are respectively arranged in a direction perpendicular to a walking direction of the grass combing machine. In some embodiments, the numbers of the first bracket 8 and/or the second bracket 9 are one, or more than two.

The traction frame 5 includes two traction rods 51, each traction rod 51 is correspondingly connected to one of the first brackets 8 and one of the second brackets 9. When the traction end of the traction frame 5 swings up and down, the two traction rods 51 rotate around the first bolts 81, and the end away from the traction end moves along the slot. The grass combing machine may walk stably due to the connection of the two traction rods 51 and the mounting main body 1.

The traction end of the traction frame 5 is connected to a traction joint 52. The traction joint 52 includes two traction plates 521 arranged vertically. The two traction plates 521 form a gap in which a connecting plate of a walking device can be inserted, and connecting holes in which a connecting column 53 can be inserted are formed in the two traction plates 521. In this way, to connect the traction frame 5 and a walking device, the connecting plate arranged on the walking device is inserted into the gap between the two traction plates 521, and the connecting column 53 may be correspondingly inserted into the connecting holes formed in the two traction plates 521 and the connecting plate of the walking device, so that the two traction plates 521 are connected to the walking device. The connecting column 53 may be a pin or a bolt, and a pin may be inserted laterally into the end away from the cap head of the pin or the bolt to prevent the pin or bolt from coming out.

In an embodiment, the grass combing machine further includes a height-adjusting mechanism configured to adjust the height position of the mounting main body 1 relative to the wheel 3, so that the grass combing mechanism may be switched between a working position close to ground and a retracted position away from ground.

When the grass combing machine works, the mounting main body 1 may be lowered by adjusting the height-adjusting mechanism, and the elastic grass combing components 2 on the mounting main body 1 are at an appropriate height capable of combing the lawn, that is, the grass combing machine is switched to a working state. When the grass combing machine is not in operation, the mounting main body 1 may be raised by adjusting the height-adjusting mechanism, so that the elastic grass combing components 2 are far away from the ground, that is, the grass combing machine is switched to a retracted state, so that the grass combing machine may walk conveniently.

In an embodiment, as shown in FIG. 5, the grass combing machine further includes a wheel mounting frame 4, the wheel mounting frame 4 is rotatably mounted on the mounting main body 1, and the wheel 3 is rotatably mounted on the wheel mounting frame 4.

Figure 8:
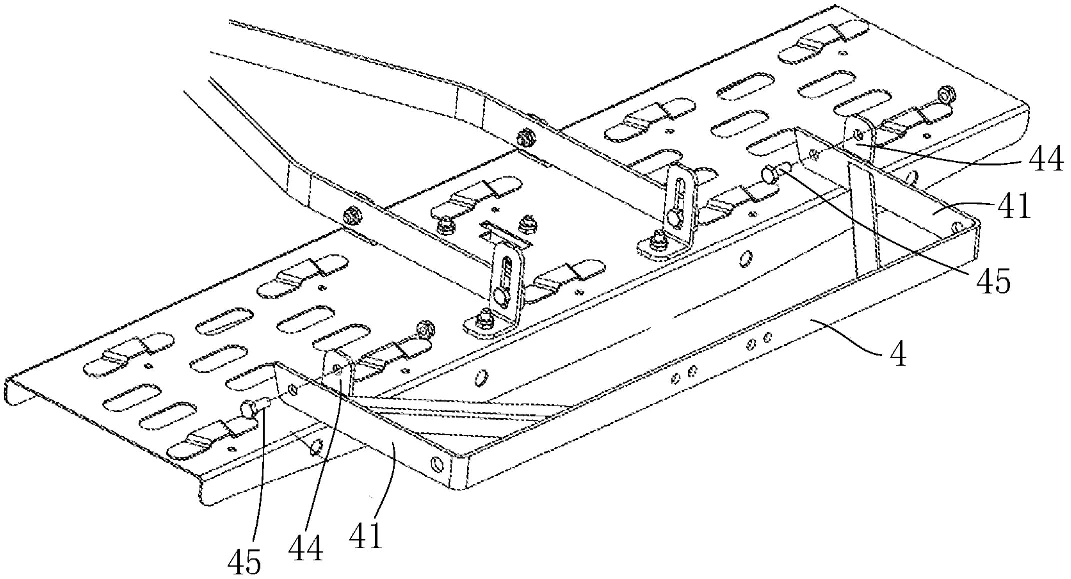
FIG. 8 is a schematic diagram of a mounting structure of a wheel mounting frame according to an embodiment of the present application.

Specifically, in the embodiments shown in FIG. 5 and FIG. 8, the wheel mounting frame 4 includes two vertical beams 41 connected to the mounting main body 1 and a cross beam 42 connecting the two vertical beams 41, and reinforcing beams 43 are connected between the cross beam 42 and the vertical beams 41. The vertical beams 41 are also rotatably connected to the third brackets 44 on the mounting main body 1 by two third bolts 45, and the two wheels 3 are rotatably connected to the two vertical beams 41 by rotating shafts respectively, so that the wheel mounting frame 4 may rotate relative to the mounting main body 1 and the wheels 3, respectively.

An adjusting hole 12 is provided on the mounting main body 1, the adjusting hole 12 includes a first length slot 121 and a second length slot 122 communicating with each other. The length of the first length slot 121 and the second length slot 122 differs in the direction perpendicular to the axis of the wheel 3. The height-adjusting mechanism includes an adjusting rod 6 connected to the wheel mounting frame 4 and penetrating through the adjusting hole 12 upwards, and the adjusting rod 6 is arranged to switch between the first state locked in the first length slot 121 and the second state locked in the second length slot 122, so that the grass combing mechanism may switch between the working position and the retracted position.

Figure 6:
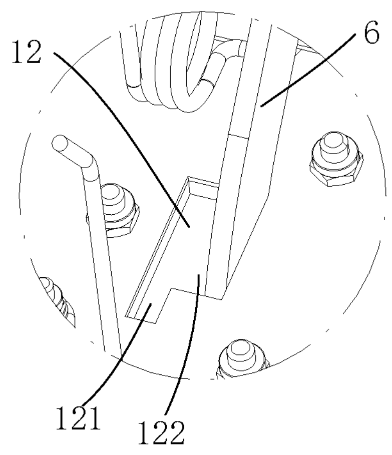
FIG. 6 is an enlarged view of portion A in FIG. 5.

In an embodiment shown in FIG. 6, the length of the first length slot 121 in the direction perpendicular to the rotating shaft of the wheel 3 is greater than that of the second length slot 122. When the adjustment rod 6 is locked in the first length slot 121, the grass combing machine is in the working position, that is, the elastic grass combing components 2 on the mounting main body 1 are close to the ground so as to comb grass; and when the adjusting rod 6 moves into the second length slot 122, the grass combing machine is switched to the retracted position, that is, the mounting main body 1 rises so that the elastic grass combing components 2 are off the ground. The wheel mounting frame 4 rotates relative to the wheel 3 and the mounting main body 1 when adjusting the height of the mounting main body 1 from the ground.

The grass combing machine may further include a reinforcing plate 7 fixed on the mounting main body 1. As shown in FIG. 4, the reinforcing plate 7 is fixed at the adjusting hole 12 of the mounting main body 1, and the reinforcing plate 7 is provided with an opening that corresponds to and has the same shape as the adjusting hole 12. That is, the adjusting rod 6 penetrates through the adjusting hole 12 in the mounting main body 1 and the opening in reinforcing plate 7, and the reinforcing plate 7 provides reinforcement at the adjusting hole 12 in the mounting main body 1. That may avoid weakening the plate-shaped mounting main body 1 due to the adjusting hole 12 and prevent the mounting main body 1 from fracturing or damaging caused when the adjustment rod 6 is locked in the openings.

In addition, in order to facilitate a user to adjust the adjustment rod 6, an upper end of the adjustment rod 6 may be provided with a handle sleeve 61, and the adjustment rod 6 may be configured as a bending shape, so that the part of the adjustment rod extending above the mounting main body 1 may extend upward for easy operation.

The foregoing is merely preferred embodiments of the present application, and is not intended to limit the present application, and any modification, equivalent replacement, and the like, made within the spirit and principle of the present application should be included within the protection scope of the present application.

What is claimed is:

1. A grass combing machine, comprising:

a wheel;

a traction frame; and a grass combing mechanism, comprising a mounting main body and a plurality of elastic grass combing components mounted on the mounting main body, wherein each of the elastic grass combing components comprises at least one elastic comb tooth and a mounting part connected with the at least one elastic comb tooth, and the mounting part is mounted on the mounting main body; the mounting main body is provided with a fixing member corresponding to each of the elastic grass combing components, a communication gap communicating from one side to the other of the fixing member is formed between the fixing member and the mounting main body, the mounting part is inserted into the communication gap from one side of the fixing member so that a middle part of the mounting part is positioned in the communication gap and an end part extends out from the other side of the fixing member, and the end part of the mounting part is fixed on the mounting main body by means of a detachable fastener;

wherein, the wheel and the traction frame are connected to the mounting main body, and the traction frame is configured to be connected to a walking device, so that the grass combing machine is capable of being pulled to walk by means of the walking device, the grass combing machine further comprises a height-adjusting mechanism configured to adjust a height position of the mounting main body relative to the wheel, so that the grass combing mechanism is capable of being switched between a working position close to ground and a retracted position away from ground;

the grass combing machine further comprises a wheel mounting frame, the wheel mounting frame is rotatably mounted on the mounting main body, and the wheel is rotatably mounted on the wheel mounting frame; and an adjusting hole is provided on the mounting main body, the adjusting hole comprises a first length slot and a second length slot communicated with each other, a length of the first length slot and a length of the second length slot are different in a direction perpendicular to the rotating shaft of the wheel, the height-adjusting mechanism comprises an adjusting rod connected to the wheel mounting frame and penetrating through the adjusting hole upwards, and the adjusting rod is arranged to switch between a first state locked in the first length slot and the second state locked in the second length slot, so that the grass combing mechanism is capable of switching between the working position and the retracted position.

2. The grass combing machine according to claim 1, wherein the grass combing machine further comprises a first bracket and a second bracket both mounted on the mounting main body, the second bracket is farther away from a traction end of the traction frame than the first bracket, and the second bracket is provided with a slot extending in a direction away from the mounting main body; and the traction frame is rotatably mounted on the first bracket by a first bolt, and is movably mounted on the second bracket along the slot by a second bolt.

3. The grass combing machine according to claim 2, wherein two of the first brackets and two of the second brackets are respectively provided, and the two first brackets and the two second brackets are respectively arranged in a direction perpendicular to a walking direction of the grass combing machine; and the traction frame comprises two traction rods, and each of the traction rods is correspondingly connected to one of the first brackets and one of the second brackets.

4. The grass combing machine according to claim 1, wherein the traction end of the traction frame is connected to a traction joint, the traction joint comprises two traction plates arranged vertically, the two traction plates form a gap for insertion of a connecting plate of the walking device, and a connecting hole for insertion of a connecting column is formed in each of the two traction plates.

5. The grass combing machine according to claim 1, wherein the grass combing machine further comprises a reinforcing plate fixed on an upper surface of the mounting main body, the reinforcing plate is fixed at the adjusting hole of the mounting main body, and the reinforcing plate is provided with an opening corresponding to the adjusting hole and having a consistent shape.

* * * * *